(12) United States Patent
Go et al.

(10) Patent No.: US 11,558,404 B2
(45) Date of Patent: Jan. 17, 2023

(54) ON-BOARD COMMUNICATION SYSTEM, SWITCHING DEVICE, VERIFICATION METHOD, AND VERIFICATION PROGRAM

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Darmawan Go, Osaka (JP); Hirofumi Urayama, Osaka (JP); Takeshi Hagihara, Yokkaichi (JP); Yasuhiro Yabuuchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 223 days.

(21) Appl. No.: 16/955,323

(22) PCT Filed: Dec. 14, 2018

(86) PCT No.: PCT/JP2018/046201
§ 371 (c)(1),
(2) Date: Jun. 18, 2020

(87) PCT Pub. No.: WO2019/167384
PCT Pub. Date: Sep. 6, 2019

(65) Prior Publication Data
US 2021/0021615 A1    Jan. 21, 2021

(30) Foreign Application Priority Data
Feb. 28, 2018    (JP) .............................. JP2018-034044

(51) Int. Cl.
*H04L 9/40* (2022.01)
*H04L 12/40* (2006.01)

(52) U.S. Cl.
CPC .......... *H04L 63/1416* (2013.01); *H04L 12/40* (2013.01); *H04L 63/08* (2013.01); *H04L 63/12* (2013.01); *H04L 2012/40273* (2013.01)

(58) Field of Classification Search
CPC ..... H04L 63/123; H04L 12/40; H04L 12/462; H04L 12/4641; H04L 63/1416;
(Continued)

(56) References Cited

U.S. PATENT DOCUMENTS

2010/0241744 A1    9/2010 Fujiwara
2016/0173530 A1    6/2016 Miyake
(Continued)

FOREIGN PATENT DOCUMENTS

JP    2010-220066 A    9/2010
JP    2013-168865 A    8/2013
(Continued)

OTHER PUBLICATIONS

USPTO Global Dossier JP 2017-005617 A Description (Translated) (Year: 2017).*

*Primary Examiner* — Benjamin A Kaplan
(74) *Attorney, Agent, or Firm* — Oliff PLC

(57) ABSTRACT

An on-vehicle communication system includes: a plurality of function units; and one or a plurality of switch devices, each switch device being configured to perform a relay process of relaying communication data between the function units. When unauthorized communication by a function unit has been detected, the switch device performs a validation process of validating a function unit other than an
(Continued)

unauthorized-communication function unit that is the function unit for which the unauthorized communication has been detected.

12 Claims, 10 Drawing Sheets

(58) Field of Classification Search
CPC ......... H04L 63/08; H04L 49/00; H04L 63/12; H04L 2012/40273
USPC ............................................................ 726/6
See application file for complete search history.

(56) References Cited

U.S. PATENT DOCUMENTS

| | | | |
|---|---|---|---|
| 2018/0302422 A1 | 10/2018 | Kishikawa et al. | |
| 2019/0182267 A1* | 6/2019 | Aher ..................... | G06F 11/302 |
| 2020/0010094 A1* | 1/2020 | Nakada ............... | B60W 50/023 |
| 2020/0244442 A1* | 7/2020 | Zeh ....................... | H04L 9/0662 |

FOREIGN PATENT DOCUMENTS

| | | |
|---|---|---|
| JP | 2017-005617 A | 1/2017 |
| JP | 2017-123639 A | 7/2017 |
| JP | 2017-147695 A | 8/2017 |

* cited by examiner

FIG. 2

| DEVICE | VID | MAC ADDRESS | IP ADDRESS |
|---|---|---|---|
| SWITCH DEVICE 101A | 1, 2 | MAC-A | IP-A |
| SWITCH DEVICE 101B | 1, 2 | MAC-B | IP-B |
| FUNCTION UNIT 111C | 1 | MAC-C | IP-C |
| FUNCTION UNIT 111D | 1 | MAC-D | IP-D |
| FUNCTION UNIT 111E | 2 | MAC-E | IP-E |
| FUNCTION UNIT 111F | 2 | MAC-F | IP-F |

FIG. 4

| TRANSMISSION SOURCE IP ADDRESS | TRANSMISSION DESTINATION IP ADDRESS |
|---|---|
| IP-C | IP-D |
| IP-D | IP-E |

Tab1

FIG. 6

| UNAUTHORIZED-COMMUNICATION FUNCTION UNIT | ABNORMALITY FUNCTION UNIT |
|---|---|
| MAC-C | MAC-D |

FIG. 8

| DEVICE | HASH VALUE | CHECKSUM |
|---|---|---|
| ON-VEHICLE COMMUNICATION DEVICE 111C | HASH-C | SUM-C |
| ON-VEHICLE COMMUNICATION DEVICE 111D | HASH-D | SUM-D |

ON-BOARD COMMUNICATION SYSTEM, SWITCHING DEVICE, VERIFICATION METHOD, AND VERIFICATION PROGRAM

TECHNICAL FIELD

The present invention relates to an on-vehicle communication system, a switch device, a validation method, and a validation program.

This application claims priority on Japanese Patent Application No. 2018-34044 filed on Feb. 28, 2018, the entire content of which is incorporated herein by reference.

BACKGROUND ART

PATENT LITERATURE 1 (Japanese Laid-Open Patent Publication No. 2017-123639) discloses an unauthorized activity detection method as below. That is, the method is an unauthorized activity detection method for detecting that an unauthorized state has occurred in an on-vehicle network system having a plurality of electronic control units that perform communication via a bus. The unauthorized activity detection method includes: determining, using unauthorized activity detection rule information indicating a first condition that is a condition regarding a relationship in content between a frame having a first identifier and a frame having an identifier that is different from the first identifier, whether or not a set of frames received from the bus satisfies the first condition; and detecting that an unauthorized state has occurred in a case where the first condition is not satisfied.

CITATION LIST

Patent Literature

PATENT LITERATURE 1: Japanese Laid-Open Patent Publication No. 2017-123639

SUMMARY OF INVENTION (1) An on-vehicle communication system of the present disclosure includes: a plurality of function units; and one or a plurality of switch devices, each switch device being configured to perform a relay process of relaying communication data between the function units. When unauthorized communication by a function unit has been detected, the switch device performs a validation process of validating a function unit other than an unauthorized-communication function unit that is the function unit for which the unauthorized communication has been detected.

(9) A switch device to be used in an on-vehicle communication system of the present disclosure includes: a switch unit configured to perform a relay process of relaying communication data between a plurality of function units; and a validation unit configured to perform, when unauthorized communication by a function unit has been detected, a validation process of validating a function unit other than an unauthorized-communication function unit that is the function unit for which the unauthorized communication has been detected.

(10) A validation method of the present disclosure is a validation method to be performed in an on-vehicle communication system. The on-vehicle communication system includes a plurality of function units and one or a plurality of switch devices, each switch device being configured to perform a relay process of relaying communication data between the function units. The validation method comprises the steps of: acquiring, performed by the switch device, a detection result of unauthorized communication performed by a function unit; transmitting, performed by the switch device, a confirmation request to a function unit serving as a communication counterpart of an unauthorized-communication function unit that is the function unit for which the unauthorized communication has been detected; and transmitting to the switch device, performed by the function unit serving as the communication counterpart of the unauthorized-communication function unit, response information to the confirmation request.

(11) A validation method of the present disclosure is a validation method to be performed in a switch device configured to perform a relay process of relaying communication data between a plurality of function units. The validation method comprises the steps of: acquiring a detection result of unauthorized communication performed by a function unit; and performing, when unauthorized communication performed by the function unit has been detected, a validation process of validating a function unit other than an unauthorized-communication function unit that is the function unit for which the unauthorized communication has been detected.

(12) A validation program of the present disclosure is a validation program to be used in a switch device. The validation program is configured to cause a computer to function as: a switch unit configured to perform a relay process of relaying communication data between a plurality of function units; and a validation unit configured to perform, when unauthorized communication by a function unit has been detected, a validation process of validating a function unit other an unauthorized-communication function unit that is the function unit for which the unauthorized communication has been detected.

One mode of the present disclosure can be realized not only as an on-vehicle communication system that includes such a characteristic processing unit but also as a program for causing a computer to execute such a characteristic process. One mode of the present disclosure can be realized as a semiconductor integrated circuit that realizes a part or the entirety of the on-vehicle communication system.

One mode of the present disclosure can be realized not only as a switch device that includes such a characteristic processing unit but also as a semiconductor integrated circuit that realizes a part or the entirety of the switch device.

BRIEF DESCRIPTION OF DRAWINGS

FIG. 2 shows an example of VID, MAC address, and IP address of each device in the on-vehicle communication system according to the embodiment of the present disclosure.

FIG. 4 shows an example of relay information in the switch device according to the embodiment of the present disclosure.

FIG. 6 shows an example of a management list according to the embodiment of the present disclosure.

FIG. 8 shows an example of a check value table held by the switch device according to the embodiment of the present disclosure.

DESCRIPTION OF EMBODIMENTS

Figure 1:
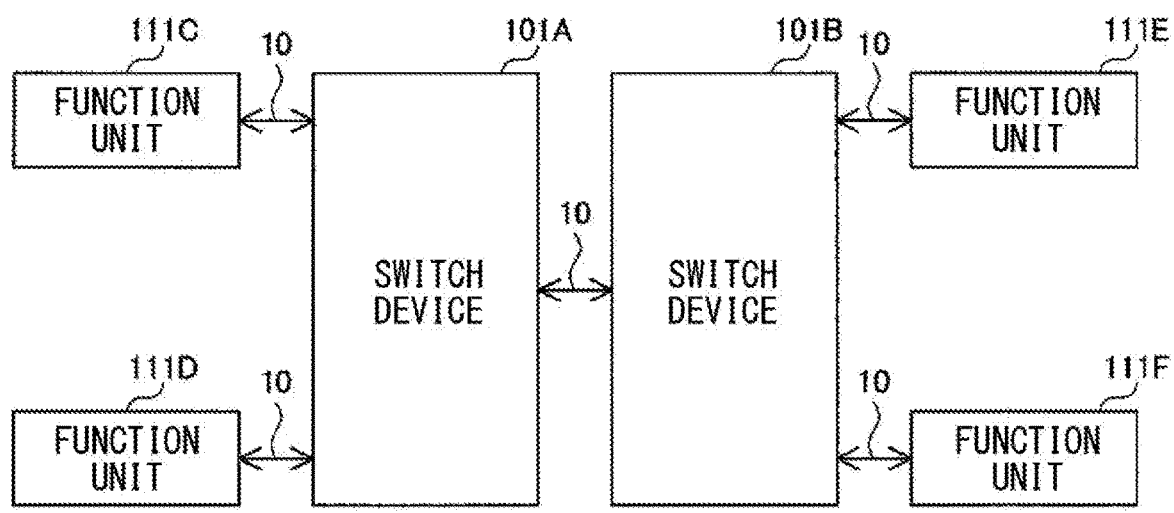
FIG. 1 shows a configuration of an on-vehicle communication system according to an embodiment of the present disclosure.

To date, on-vehicle network systems for improving security in on-vehicle networks have been developed.

Problems to be Solved by the Present Disclosure

In the on-vehicle network described in PATENT LITERATURE 1, a communication gateway that relays communication data transmitted/received between on-vehicle ECUs (Electronic Control Units) is provided.

There is a demand for a technology that can appropriately cope with a case where an unauthorized state has occurred in an on-vehicle network.

The present disclosure has been made in order to solve the above problem. An object of the present invention is to provide an on-vehicle communication system, a switch device, a validation method, and a validation program that can improve the function of coping with an unauthorized activity in an on-vehicle network.

Effects of the Present Disclosure

According to the present disclosure, the function of coping with an unauthorized activity in an on-vehicle network can be improved.

Description of Embodiment of the Present Disclosure

First, contents of an embodiment of the present disclosure are listed and described.

(1) An on-vehicle communication system according to an embodiment of the present disclosure includes: a plurality of function units; and one or a plurality of switch devices, each switch device being configured to perform a relay process of relaying communication data between the function units. When unauthorized communication by a function unit has been detected, the switch device performs a validation process of validating a function unit other than an unauthorized-communication function unit that is the function unit for which the unauthorized communication has been detected.

With this configuration, when unauthorized communication has been performed due to, for example, unauthorized rewriting into firmware in a function unit, a function unit serving as the communication counterpart of the function unit that has a possibility of being in an unauthorized or abnormal state is validated. Thus, increase of damage can be inhibited. Therefore, the function of coping with an unauthorized activity in an on-vehicle network can be improved.

(2) Preferably, the switch device: performs the relay process by using relay information indicating a relationship of communication between the function units; as the validation process, identifies a function unit serving as a communication counterpart of the unauthorized-communication function unit that is the function unit for which the unauthorized communication has been detected, on the basis of the relay information; and validates the identified function unit.

With this configuration, a function unit that communicates with the function unit that has performed unauthorized communication can be accurately and easily identified and validated.

(3) Preferably, as the validation process, the switch device further validates a secondary function unit that is a function unit serving as a communication counterpart of an abnormality function unit that is a function unit determined as having an abnormality in the validation process.

With the configuration in which the validation is performed stepwise in this manner, a function unit that has a possibility of being in an unauthorized or abnormal state can be identified, and appropriate measures can be taken before damage is increased.

(4) Preferably, the on-vehicle communication system includes a plurality of the switch devices, and each switch device holds a list indicating at least one of the unauthorized-communication function unit, and an abnormality function unit that is a function unit determined as having an abnormality in the validation process.

With this configuration, various types of measures can be easily taken by using the list indicating the identified function unit.

(5) More preferably, the switch device performs a process of, when a secondary function unit that is a function unit serving as a communication counterpart of the abnormality function unit is connected to another switch device, providing the list to the other switch device and causing the other switch device to validate the secondary function unit.

With this configuration, with respect to a function unit that is not directly connected to the switch device, the validation process can be performed via another switch device.

(6) More preferably, every time the switch device updates the list, the switch device transmits the updated list to another switch device.

With this configuration, information of the identified function unit can be always shared between the switch devices, and a validation process in a wider range can be performed.

(7) Preferably, in the validation process, the switch device acquires validation data for stored data from the function unit, and validates the function unit by using the acquired validation data.

With this configuration, in the switch device, an abnormality such as falsification of firmware of the function unit can be detected.

(8) Preferably, in the validation process, the switch device acquires authentication data for stored data from the function unit, and validates the function unit by using the acquired authentication data.

With this configuration, an abnormality such as falsification of firmware can be detected by a simpler process.

(9) A switch device according to an embodiment of the present disclosure is a switch device to be used in an on-vehicle communication system. The switch device includes: a switch unit configured to perform a relay process of relaying communication data between a plurality of function units; and a validation unit configured to perform, when unauthorized communication by a function unit has been detected, a validation process of validating a function unit other than an unauthorized-communication function unit that is the function unit for which the unauthorized communication has been detected.

With this configuration, when unauthorized communication has been performed due to, for example, unauthorized rewriting into firmware in a function unit, a function unit serving as the communication counterpart of the function unit that has a possibility of being in an unauthorized or abnormal state is validated. Thus, increase of damage can be inhibited. Therefore, the function of coping with an unauthorized activity in an on-vehicle network can be improved.

(10) A validation method according to an embodiment of the present disclosure is a validation method to be performed in an on-vehicle communication system. The on-vehicle communication system includes a plurality of function units and one or a plurality of switch devices, each switch device being configured to perform a relay process of relaying communication data between the function units. The validation method comprises the steps of: acquiring, performed by the switch device, a detection result of unauthorized communication performed by a function unit; transmitting, performed by the switch device, a confirmation request to a function unit serving as a communication counterpart of an unauthorized-communication function unit that is the function unit for which the unauthorized communication has been detected; and transmitting to the switch device, performed by the function unit serving as the communication counterpart of the unauthorized-communication function unit, response information to the confirmation request.

With this configuration, when unauthorized communication has been performed due to, for example, unauthorized rewriting into firmware in a function unit, a function unit serving as the communication counterpart of the function unit that has a possibility of being in an unauthorized or abnormal state is validated. Thus, increase of damage can be inhibited. Therefore, the function of coping with an unauthorized activity in an on-vehicle network can be improved.

(11) A validation method according to an embodiment of the present disclosure is a validation method to be performed in a switch device configured to perform a relay process of relaying communication data between a plurality of function units. The validation method comprises the steps of: acquiring a detection result of unauthorized communication performed by a function unit; and performing, when the unauthorized communication performed by the function unit has been detected, a validation process of validating a function unit other than an unauthorized-communication function unit that is the function unit for which the unauthorized communication has been detected.

With this configuration, when unauthorized communication has been performed due to, for example, unauthorized rewriting into firmware in a function unit, a function unit serving as the communication counterpart of the function unit that has a possibility of being in an unauthorized or abnormal state is validated. Thus, increase of damage can be inhibited. Therefore, the function of coping with an unauthorized activity in an on-vehicle network can be improved.

(12) A validation program according to an embodiment of the present disclosure is a validation program to be used in a switch device. The validation program is configured to cause a computer to function as: a switch unit configured to perform a relay process of relaying communication data between a plurality of function units; and a validation unit configured to perform, when unauthorized communication by a function unit has been detected, a validation process of validating a function unit other an unauthorized-communication function unit that is the function unit for which the unauthorized communication has been detected.

With this configuration, when unauthorized communication has been performed due to, for example, unauthorized rewriting into firmware in a function unit, a function unit serving as the communication counterpart of the function unit that has a possibility of being in an unauthorized or abnormal state is validated. Thus, increase of damage can be inhibited. Therefore, the function of coping with an unauthorized activity in an on-vehicle network can be improved.

Hereinafter, embodiments of the present disclosure will be described with reference to the drawings. In the drawings, the same or corresponding parts are denoted by the same reference characters, and description thereof is not repeated. At least some parts of the embodiments described below may be combined together as desired.

Configuration and Basic Operation

FIG. 1 shows a configuration of an on-vehicle communication system according to an embodiment of the present disclosure.

With reference to FIG. 1, an on-vehicle communication system 301 includes switch devices 101A, 101B, and function units 111C, 111D, 111E, 111F. The on-vehicle communication system 301 is installed in a vehicle 1.

Hereinafter, each of the switch devices 101A, 101B will also be referred to as a switch device 101. Each of the function units 111C, 111D, 111E, 111F will also be referred to as a function unit 111.

The configuration of the on-vehicle communication system 301 is not limited to a configuration including two switch devices 101, but may be a configuration including one, three, or more switch devices 101.

The configuration of the on-vehicle communication system 301 is not limited to a configuration including four function units 111, but may be a configuration including two, three, six, or more function units 111.

The function unit 111 is, for example, an automated driving ECU (Electronic Control Unit), a driving support device, a sensor, or the like, and can perform communication with the switch device 101.

The connection relationship between each switch device 101 and each function unit 111 in an on-vehicle network of the vehicle 1 is fixed, for example.

The switch device 101 and the function unit 111 are connected to each other by an on-vehicle Ethernet (registered trademark) communication cable (hereinafter, also referred to as an Ethernet cable) 10, for example.

The switch device 101 and the function unit 111 perform communication with each other by using an Ethernet cable 10. Between the switch device 101 and the function unit 111, communication data is communicated by using an Ethernet frame according to IEEE802.3, for example.

FIG. 2 shows an example of VID, MAC address, and IP address of each device in the on-vehicle communication system according to the embodiment of the present disclosure.

With reference to FIG. 2, in the on-vehicle network, for example, the function units 111C, 111D and the function units 111E, 111F belong to VLANs (Virtual Local Area Network) different from each other.

In this example, the ID (hereinafter, also referred to as VID) of the VLAN to which the function units 111C, 111D belong is 1. The VID to which the function units 111E, 111F belong is 2.

The switch device 101 and the function unit 111 each have a MAC (Media Access Control) address and an IP (Internet Protocol) address that are unique thereto.

With reference to FIG. 1 again, the switch device 101 performs a relay process of relaying data between function units 111 in the on-vehicle network.

More specifically, the switch device 101 can perform the relay process according to a layer 2, and a layer 3, which is of a higher order than the layer 2, for example.

Specifically, in the on-vehicle network, for example, information is transmitted/received by using an IP packet, according to an IP protocol. The IP packet is stored in an Ethernet frame and transmitted.

The switch device 101 relays data in the on-vehicle network. Specifically, the switch device 101 relays an Ethernet frame transmitted between function units 111.

Specifically, the switch device 101 operates in accordance with a communication protocol having a plurality of layers. More specifically, the switch device 101 can function as an L2 (layer 2) switch, and relays an Ethernet frame transmitted between function units 111 that belong to the same VLAN.

The switch device 101 can also function as an L3 (layer 3) relay device, and relays an Ethernet frame between function units 111 that belong to different VLANs.

Specifically, when the function unit 111C transmits an IP packet to the function unit 111D, this IP packet includes IP-C and IP-D as a transmission source IP address and a transmission destination IP address, respectively.

Since the function unit 111C and the function unit 111D belong to the same VLAN, the function unit 111C writes 1, MAC-C, and MAC-D, as the VID, the transmission source MAC address, and the transmission destination MAC address, respectively, into the Ethernet frame.

The function unit 111C transmits the Ethernet frame having the IP packet stored therein, to the switch device 101A.

Upon receiving the Ethernet frame from the function unit 111C, the switch device 101A performs a switching process of the layer 2 on the received Ethernet frame, thereby transmitting the Ethernet frame to the function unit 111D.

When the function unit 111C transmits an IP packet to the function unit 111E, this IP packet includes IP-C and IP-E as the transmission source IP address and the transmission destination IP address, respectively.

Since the function unit 111C and the function unit 111E belong to different VLANs, the function unit 111C writes 1, MAC-A, i.e., the MAC address of the switch device 101A serving as the default gateway, and MAC-C, as the VID, the transmission destination MAC address, and the transmission source MAC address, respectively, into the Ethernet frame.

The function unit 111C transmits the Ethernet frame having the IP packet stored therein, to the switch device 101A.

Upon receiving the Ethernet frame from the function unit 111C, the switch device 101A performs a relay process of the layer 3 on the received Ethernet frame, thereby transmitting the Ethernet frame to the function unit 111E.

Problem

For example, the switch device 101A can detect unauthorized communication such as data being transmitted at a timing different from a usual timing. In this case, when the switch device 101A has detected unauthorized communication with the function unit 111C, for example, the switch device 101A takes measures such as stopping the communication with the function unit 111C.

However, in this case, the function unit 111D and the switch device 101B which are connected to the switch device 101A could be negatively affected due to the influence of the unauthorized communication. In addition, the function unit 111E and the function unit 111F which are connected to the switch device 101B could also be negatively affected.

For this, the switch device according to the embodiment of the present disclosure solves the above-described problem by the configuration and operation as described below.

Configuration of Switch Device

Figure 3:
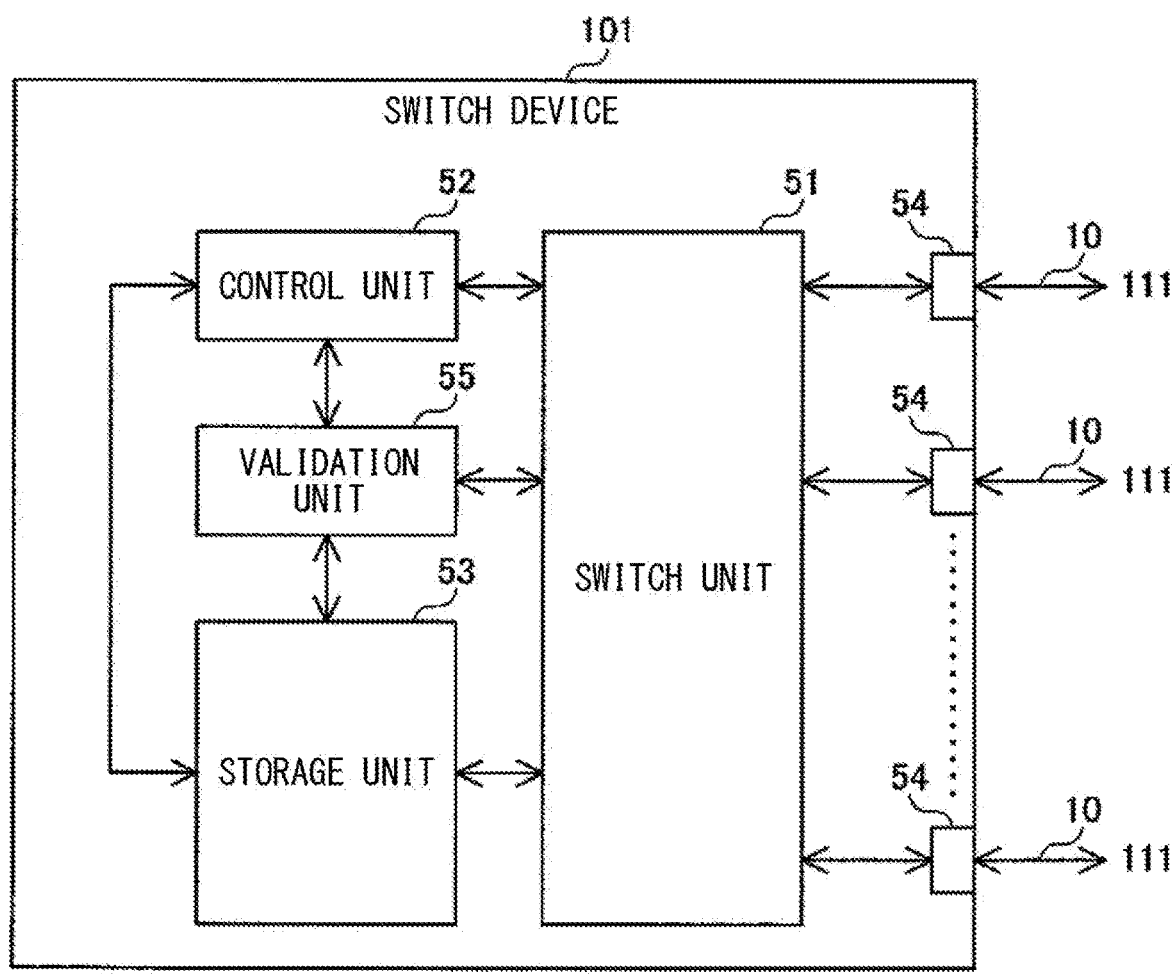
FIG. 3 shows a configuration of a switch device in the on-vehicle communication system according to the embodiment of the present disclosure.

FIG. 3 shows a configuration of the switch device in the on-vehicle communication system according to the embodiment of the present disclosure.

With reference to FIG. 3, the switch device 101 includes a switch unit 51, a control unit 52, a storage unit 53, a plurality of communication ports 54, and a validation unit 55.

As an example, the switch device 101A shown in FIG. 1 includes a switch unit 51A, a control unit 52A, a storage unit 53A, a plurality of communication ports 54A, and a validation unit 55A. The switch device 101B includes a switch unit 51B, a control unit 52B, a storage unit 53B, a plurality of communication ports 54B, and a validation unit 55B.

The communication port 54 in the switch device 101 is a terminal to which an Ethernet cable 10 can be connected, for example. The communication port 54 may be a terminal of an integrated circuit.

Each of the plurality of communication ports 54 is connected to any one of the plurality of function units 111 via an Ethernet cable 10. Each of the plurality of communication ports 54 is associated with a VLAN, for example.

The switch unit 51 performs a relay process of relaying communication data by using relay information indicating the relationship of communication between function units 111. The storage unit 53 holds communication data that should be relayed.

FIG. 4 shows an example of the relay information in the switch device according to the embodiment of the present disclosure.

With reference to FIG. 4, a relay information Tab 1 shows a correspondence relationship between a transmission source and a transmission destination of communication data. In the relay information Tab1, IP-D is registered as the transmission destination IP address that corresponds to IP-C which is the transmission source IP address, and IP-E is registered as the transmission destination IP address that corresponds to IP-D which is the transmission source IP address.

By monitoring the relay process performed by the switch unit 51, the control unit 52 acquires a communication path of the communication data to be relayed by the switch unit 51, and registers the communication path into the relay information Tab1. The switch device 101 stores the relay information Tab1 in the storage unit 53.

More specifically, for example, the switch unit 51 operates as an L2 switch, and relays an Ethernet frame between function units 111 that belong to the same VLAN.

Specifically, for example, the switch unit 51 holds an address table indicating a correspondence relationship among the port number of a communication port 54, the ID of the VLAN, and the MAC address of the connection destination device.

For example, in the switch device 101A, when the switch unit 51A has received an Ethernet frame from the function unit 111C, the switch unit 51A stores the received Ethernet frame into the storage unit 53A and confirms the destination MAC address of the Ethernet frame.

At this time, when the control unit 52A has confirmed that the switch unit 51A has stored, into the storage unit 53A, the Ethernet frame received via a corresponding communication port 54A from the function unit 111C, the control unit 52A confirms the transmission source IP address and the transmission destination IP address included in the Ethernet frame stored in the storage unit 53A, i.e., the IP address of the function unit 111C as the transmission source IP address, and the IP address of the function unit 111D as the transmission destination IP address.

Then, the control unit 52A registers the confirmed IP addresses as "transmission source IP address" and "transmission destination IP address", respectively, into the relay information Tab1.

In the relay information Tab1, the communication path is registered by using "transmission source IP address" and "transmission destination IP address". However, not limited thereto, the communication path may be registered by using "reception source MAC address" and "transmission destination MAC address", or "port number of the communication port 54A of the reception source" and "port number of the communication port 54A of the transmission destination".

By referring to the address table, the switch unit 51A identifies a communication port 54A that corresponds to the confirmed destination MAC address. Here, the switch unit 51 identifies a communication port 54A that is connected to the function unit 111D.

Then, the switch unit 51 acquires the Ethernet frame from the storage unit 53A, and transmits the acquired Ethernet frame to the function unit 111D via the identified communication port 54A.

Meanwhile, for example, the switch unit 51 operates as an L3 switch or an L4 switch, and relays communication data between function units 111 that belong to different VLANs.

Specifically, for example, the switch unit 51 holds a network table indicating a correspondence relationship between an ID of the VLAN and a network address. For example, the switch unit 51 holds, for each ID of the VLAN, an ARP (Address Resolution Protocol) table indicating a correspondence relationship between an IP address and a MAC address.

For example, in the switch device 101A, when the switch unit 51A has received an Ethernet frame from the function unit 111D, the switch unit 51A confirms that the destination MAC address is the MAC address of the switch unit 51A, and takes out the IP packet from the received Ethernet frame.

By referring to the network table, the switch unit 51A identifies the ID of the VLAN that corresponds to the destination IP address included in the IP packet.

Then, by referring to the ARP table that corresponds to the identified ID of the VLAN, the switch unit 51A acquires the MAC address of the gateway of the VLAN that corresponds to the destination IP address.

The switch unit 51A creates an Ethernet frame that includes the acquired MAC address as the destination MAC address and that includes the IP packet, and stores the Ethernet frame into the storage unit 53.

At this time, when the control unit 52A has confirmed that the switch unit 51A has stored the Ethernet frame into the storage unit 53A, the control unit 52A confirms the transmission source IP address and the transmission destination IP address included in the Ethernet frame stored in the storage unit 53A, i.e., the IP address of the function unit 111D as the transmission source IP address, and the IP address of the function unit 111E as the transmission destination IP address.

Then, the control unit 52A registers the IP address of the function unit 111D and the IP address of the function unit 111E as "transmission source IP address", and "transmission destination IP address", respectively, into the relay information Tab1.

By referring to the address table, the switch unit 51A identifies a communication port 54 that corresponds to the destination MAC address, i.e., a communication port 54 that is connected to the switch device 101B.

Then, the switch unit 51A acquires the Ethernet frame from the storage unit 53, and transmits the acquired Ethernet frame to the switch device 101B via the identified communication port 54.

The switch device 101B operates as an L2 switch with respect to the Ethernet frame transmitted from the switch device 101A, and relays the Ethernet frame to the function unit 111E.

Meanwhile, when the switch device 101 has detected unauthorized communication performed by a function unit 111, the switch device 101 performs a validation process of validating another function unit 111 that is connected to the switch device 101, i.e., a function unit 111 other than an unauthorized-communication function unit that is the function unit 111 for which the unauthorized communication has been detected.

More specifically, the control unit 52 can detect unauthorized communication such as data being transmitted at a timing different from a usual timing. Upon detecting unauthorized communication, the control unit 52 outputs, to the validation unit 55, information to the effect that unauthorized communication has been detected, and information indicating the port number of the communication port 54 for which the unauthorized communication has been detected.

The validation unit 55 refers to the address table held by the switch unit 51, and acquires the MAC address of the connection destination function unit 111 on the basis of the port number of the communication port 54 for which the unauthorized communication has been detected.

Then, the validation unit 55 refers to the ARP table held by the switch unit 51, and acquires the IP address that corresponds to the acquired MAC address.

Then, as the validation process, the validation unit 55 identifies a function unit 111 serving as the communication counterpart of the unauthorized-communication function unit, on the basis of the relay information Tab1 stored in the storage unit 53.

In the following, such a function unit 111 that is other than the unauthorized-communication function unit and that is the communication counterpart of the unauthorized-communication function unit will also be referred to as a primary function unit.

More specifically, the validation unit 55 refers to the relay information Tab1 stored in the storage unit 53, and acquires a transmission destination IP address of a communication path for which the acquired IP address, i.e., the IP address of the unauthorized-communication function unit, is registered as the transmission source IP address, whereby the validation unit 55 identifies the primary function unit.

The validation unit 55 validates the identified primary function unit. For example, when the function unit 111C shown in FIG. 1 is an unauthorized-communication function unit, and the IP address of the function unit 111D is registered as a corresponding transmission destination IP address in the relay information Tab1, the validation unit 55A validates the function unit 111D. That is, the validation unit 55 determines whether or not the function unit 111D has an abnormality.

Specifically, for example, the validation unit 55A generates an Ethernet frame that includes a resetting command, and outputs the Ethernet frame to the switch unit 51A.

The switch unit 51A writes MAC-A and MAC-D as the transmission source MAC address and the transmission destination MAC address, respectively, into the Ethernet frame.

By referring to the address table, the switch unit 51A identifies a communication port 54A that corresponds to the transmission destination MAC address, and the switch unit 51A transmits, to the function unit 111D via the identified communication port 54A, the Ethernet frame received from the validation unit 55A.

The function unit 111D receives the Ethernet frame including the resetting command, and restarts.

Figure 5:
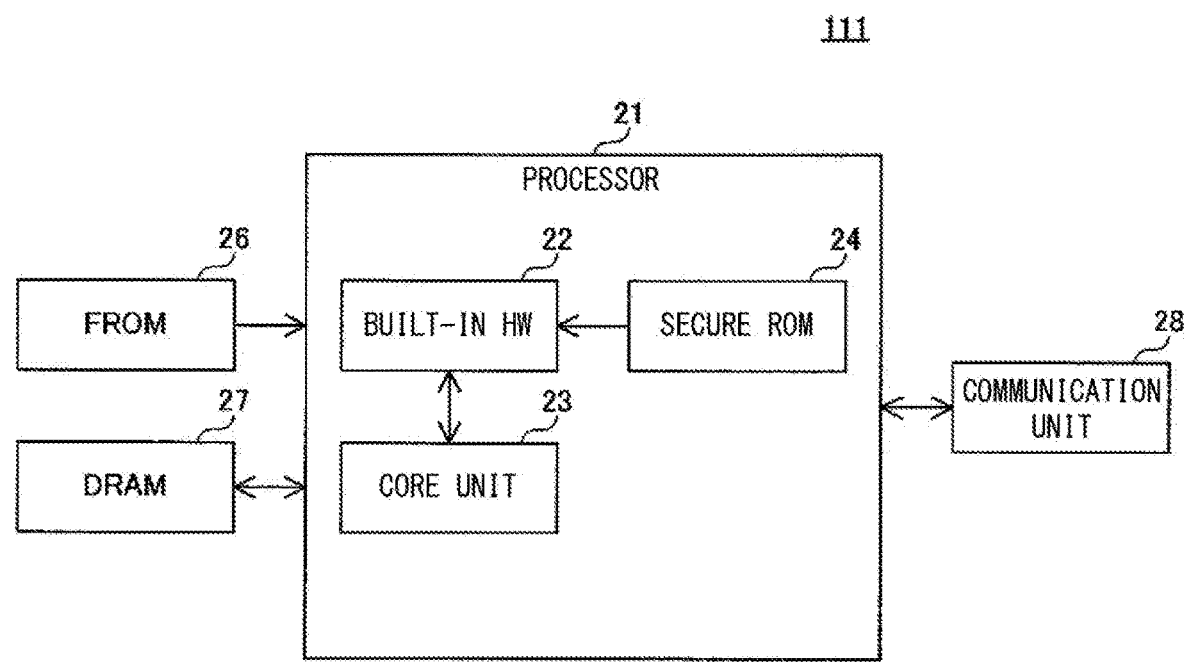
FIG. 5 shows an example of a configuration of a function unit in the on-vehicle communication system according to the embodiment of the present disclosure.

FIG. 5 shows an example of a configuration of the function unit in the on-vehicle communication system according to the embodiment of the present disclosure.

With reference to FIG. 5, the function unit 111 includes a processor 21, an FROM (Flash Read Only Memory) 26, a DRAM (Dynamic Random Access Memory) 27, and a communication unit 28. The processor 21 includes a built-in hardware (HW) 22, a core unit 23, and a secure ROM 24.

The built-in hardware 22 is hardware dedicated for security, such as a cryptographic accelerator, for example, and validates whether or not data stored in the FROM 26 is proper.

The FROM 26 has stored therein target data TD911 including data, application programs, and the like, and a validation value VV911, for example. The data stored in the FROM 26 is rewritable.

The secure ROM 24 has stored therein a first cipher key to be used in validation of the target data TD911, and is a storage region that cannot be accessed from outside of the processor 21.

More specifically, the secure ROM 24 is a secure storage region for which only access from the built-in hardware 22 is permitted. The first cipher key is stored in the secure ROM 24 before shipment of the product, for example.

The first cipher key stored in the secure ROM 24 can be acquired only by the built-in hardware 22, and is not rewritable.

More specifically, in the secure ROM 24, a validation key VK11, which is an example of the first cipher key generated by a key generation tool, is stored as a validation value validation key during production of the function unit 111.

In addition, in the secure ROM 24, a generation key GK1 is stored as a validation value generation key that corresponds to the validation key VK11.

For example, when the function unit 111D has restarted, the core unit 23 outputs a validation request for the target data TD911, to the built-in hardware 22.

Upon receiving the validation request from the core unit 23, the built-in hardware 22 acquires the validation key VK11 and the generation key GK1 from the secure ROM 24 in accordance with the received validation request.

In addition, the built-in hardware 22 acquires the target data TD911 and the validation value VV911 from the FROM 26 in accordance with the validation request.

The built-in hardware 22 validates the target data TD911 by using the target data TD911, the validation key VK11, the generation key GK1, and the validation value VV911 that have been acquired.

More specifically, the built-in hardware 22 generates a digest of the target data TD911 by using a hash function HF1 on the basis of the generation key GK1 and the target data TD911. In addition, the built-in hardware 22 generates a digest by decoding the validation value VV911 by using the validation key VK11.

The built-in hardware 22 collates the generated digests with each other. If the digests match each other, the built-in hardware 22 determines that the target data TD911 is proper, and if the digests do not match each other, the built-in hardware 22 determines that the target data TD911 is not proper.

For example, when data such as firmware stored in the FROM 26 has been falsified due to influence of unauthorized communication, the digests do not match each other. Accordingly, the built-in hardware 22 can detect an abnormality in the function unit 111.

Then, the built-in hardware 22 stores, for example, into the FROM 26, validation result information indicating the determination result, and, in addition, outputs the validation result information to the core unit 23.

Upon receiving the validation result information from the built-in hardware 22, the core unit 23 acquires the target data TD911 from the FROM 26.

By executing a boot loader and an OS program, the core unit 23 operates according to the OS program, and causes the state of the function unit 111 to be shifted to an initial state.

For example, when the state of the function unit 111D has been shifted to the initial state, the function unit 111D becomes able to communicate with the switch device 101A.

As a result of the switch device 101A becoming able to communicate with the function unit 111, the switch device 101A detects completion of the restart of the function unit 111. Then, the switch device 101A transmits a confirmation request to the function unit 111D.

More specifically, the validation unit 55A generates an Ethernet frame that includes, as the confirmation request, a validation result request indicating that the validation result information is requested, and outputs the Ethernet frame to the switch unit 51A.

The switch unit 51A writes the transmission source MAC address and the transmission destination MAC address into the Ethernet frame, and refers to the address table, thereby identifying a communication port 54 that corresponds to the transmission destination MAC address. Then, the switch unit 51A transmits, to the function unit 111D via the identified communication port 54, the Ethernet frame received from the validation unit 55A.

When the communication unit 28 in the function unit 111D has received the Ethernet frame including the validation result request from the switch device 101A, the communication unit 28 acquires the validation result request included in the Ethernet frame, and outputs the validation result request to the processor 21.

When the core unit 23 in the processor 21 has received the validation result request from the communication unit 28, the core unit 23 acquires the validation result information from the FROM 26, and outputs the validation result information to the communication unit 28.

The communication unit 28 generates an Ethernet frame that includes the validation result information received from the core unit 23, and transmits the Ethernet frame to the switch device 101A.

Upon receiving the Ethernet frame transmitted from the function unit 111D, the switch device 101A stores the received Ethernet frame into the storage unit 53A.

The validation unit 55A confirms the validation result information included in the Ethernet frame stored in the storage unit 53A, thereby determining whether or not the function unit 111D has an abnormality.

The switch device 101A holds a list that indicates at least one of an abnormality function unit that is a function unit 111 determined as having an abnormality in the validation process, and an unauthorized-communication function unit that is a function unit 111 for which unauthorized communication has been detected. In the following, such a list is also referred to as a management list.

More specifically, in the switch device 101A, the validation unit 55A refers to the address table held by the switch unit 51A. Then, the validation unit 55A acquires the MAC address of the connection destination function unit 111 on the basis of the port number of the communication port 54A for which the unauthorized communication has been detected, thereby creating a management list. Alternatively, the validation unit 55A updates an already created management list by registering the acquired MAC address into the management list. Then, the validation unit 55A stores the management list into the storage unit 53A.

In addition, the validation unit 55A updates the management list by registering the MAC address of an abnormality function unit into the management list.

FIG. 6 shows an example of the management list according to the embodiment of the present disclosure.

With reference to FIG. 6, for example, MAC-C and MAC-D, which are the respective MAC addresses of the function unit 111C and the function unit 111D shown in FIG. 1, are registered in the management list.

For example, the function unit 111C is an unauthorized-communication function unit, and the function unit 111D is an abnormality function unit.

Every time the validation unit 55A updates the management list, the validation unit 55A transmits the updated management list to another switch device. For example, since the switch device 101A shown in FIG. 1 is connected to the switch device 101B, the switch device 101A transmits an updated management list A to the switch device 101B.

More specifically, the validation unit 55A generates an Ethernet frame that includes the updated management list A and outputs the Ethernet frame to the switch unit 51. For example, as shown in FIG. 6, the function unit 111C is registered as the unauthorized-communication function unit, and the function unit 111D is registered as the abnormality function unit in the updated management list A.

The switch unit 51A writes MAC-A and MAC-B as the transmission source MAC address and the transmission destination MAC address, respectively, into the Ethernet frame.

By referring to the address table, the switch unit 51A identifies a communication port 54A that corresponds to the transmission destination MAC address, and the switch unit 51A transmits, to the switch device 101B via the identified communication port 54A, the Ethernet frame received from the validation unit 55A.

In the switch device 101B, when the switch unit 51B has received the Ethernet frame including the management list A from the switch device 101A, the switch unit 51B stores the management list A included in the received Ethernet frame, into the storage unit 53B.

When the switch device 101B already has a management list B stored in the storage unit 53B, the validation unit 55 merges the management list A and management list B together, thereby creating a new management list C.

The switch device 101B transmits the created management list C to another switch device 101 such as the switch device 101A or the like.

In a case where a secondary function unit that is a function unit 111 serving as the communication counterpart of an abnormality function unit that is a function unit 111 determined as having an abnormality in the validation process, is connected to another switch device 101, the switch device 101A performs a process of providing the other switch device 101 with the management list and causing the other switch device 101 to validate the secondary function unit.

Specifically, for example, the validation unit 55A identifies the communication counterpart of the function unit 111D registered as the abnormality function unit in the management list A.

The validation unit 55A refers to the management list A and acquires the MAC address of the function unit 111D. The validation unit 55A refers to the ARP table and acquires the IP address that corresponds to the acquired MAC address. By referring to the relay information Tab1 shown in FIG. 4, the validation unit 55A acquires the IP address of the function unit 111E, which is the transmission destination IP address for the communication path for which the acquired IP address is registered as the transmission source IP address.

The validation unit 55A refers to the address table, the ARP table, and the network table, and confirms that the function unit 111E corresponding to the transmission destination IP address is not connected to the switch device 101A and is connected to the switch device 101B.

Then, the validation unit 55A transmits the management list A to the switch device 101B. More specifically, the validation unit 55A generates an Ethernet frame that includes the management list A and outputs the Ethernet frame to the switch unit 51.

The switch unit 51A writes MAC-A and MAC-B as the transmission source MAC address and the transmission destination MAC address, respectively, into the Ethernet frame.

By referring to the address table, the switch unit 51A identifies a communication port 54A that corresponds to the transmission destination MAC address, and the switch unit 51A transmits, to the switch device 101B via the identified communication port 54A, the Ethernet frame received from the validation unit 55A.

In the switch device 101B, the switch unit 51B receives the Ethernet frame including the management list A from the switch device 101A, and stores the management list A included in the Ethernet frame into the storage unit 53B.

The validation unit 55B refers to the management list A stored in the storage unit 53B, and acquires MAC addresses that correspond to the unauthorized-communication function unit and the abnormality function unit registered in the management list A. The validation unit 55B refers to the ARP table, and acquires IP addresses that correspond to the acquired MAC addresses. Then, the validation unit 55B searches for a function unit 111 that has the acquired IP address that is registered as the transmission source IP address in the relay information Tab2 stored in the storage unit 53B.

Figure 7:
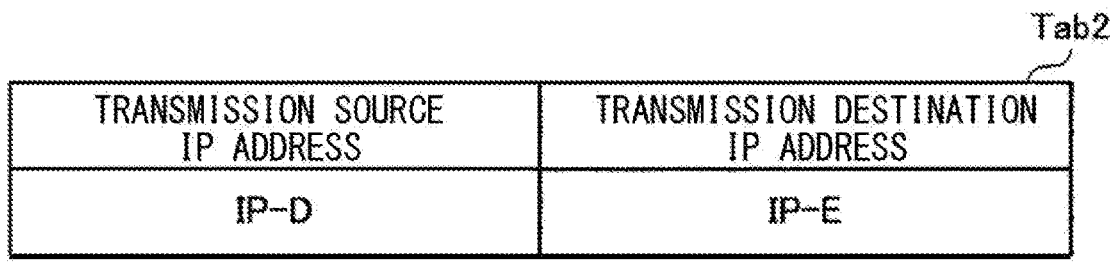
FIG. 7 shows another example of relay information in the switch device according to the embodiment of the present disclosure.

FIG. 7 shows another example of the relay information in the switch device according to the embodiment of the present disclosure.

With reference to FIG. 7, IP-D is registered as the transmission source IP address and IP-E is registered as the transmission destination IP address in the relay information Tab2 stored in the storage unit 53B.

Specifically, since the function unit 111D is registered as the abnormality function unit in the management list A, the validation unit 55B refers to the relay information Tab2 and searches for IP-D registered as the transmission source IP address.

The validation unit 55B acquires IP-E, which is the transmission destination IP address for the communication path for which IP-D is registered as the transmission source IP address, whereby the validation unit 55B identifies the function unit 111E as the secondary function unit.

Then, as the validation process, the validation unit 55B further validates the function unit 111E, which has been identified as the secondary function unit. In the validation process for the function unit 111E, when the validation unit 55B has determined that the function unit 111E has an abnormality, the validation unit 55B registers the function unit 111E as the abnormality function unit into the management list A, thereby updating the management list A.

Then, the validation unit 55B transmits the updated management list A to the switch device 101A.

In addition, by performing a process similar to the above, the validation unit 55B searches for a secondary function unit for the function unit 111E identified as the abnormality function unit. When a secondary function unit exists, the validation unit 55B validates the secondary function unit.

The validation unit 55B continues the above-described process until secondary function units corresponding to all abnormality function units registered in the management list A are validated.

The validation unit 55B may create the management list after the above validation process ends, and then register the unauthorized-communication function unit and the abnormality function unit.

Modification 1

In the validation process, the switch device 101 acquires validation data for stored data from the function unit 111, and validates the function unit 111 by using the acquired validation data.

In the on-vehicle communication system 301, for example, when the function unit 111 does not include the secure ROM 24 shown in FIG. 5, the switch device 101 acquires validation data for stored data from the function unit 111 and validates the function unit 111 by using the acquired validation data.

More specifically, for example, during production of the function unit 111, during update of firmware of the function unit, and the like, the switch device 101 performs writing regarding the firmware of the function unit 111.

Using a hash function, the switch device 101 calculates a hash value of the firmware to be written. In addition, the switch device 101 calculates a checksum of the firmware to be written.

The switch device 101 holds, in the storage unit 53, the calculated hash value and checksum in association with the function unit 111.

FIG. 8 shows an example of a check value table held by the switch device according to the embodiment of the present disclosure.

With reference to FIG. 8, for example, the hash value and the checksum of the firmware written in the function unit 111C by the switch device 101A are HASH-C and SUM-C, respectively, and the hash value and the checksum of the firmware written in the function unit 111D by the switch device 101A are HASH-D and SUM-D, respectively.

In the validation process, for example, the switch device 101A transmits a resetting command to the function unit 111D and forcedly causes the function unit 111D to restart.

When the restart has been completed and the state has been shifted to the initial state, the function unit 111D becomes able to communicate with the switch device 101A.

As a result of the switch device 101A becoming able to communicate with the function unit 111D, the switch device 101A detects completion of the restart of the function unit 111D. Then, the switch device 101A transmits a confirmation request to the function unit 111D.

More specifically, the validation unit 55A generates an Ethernet frame that includes, as the confirmation request, a validation data request indicating that validation data is requested, and outputs the Ethernet frame to the switch unit 51A.

The switch unit 51A writes a transmission source MAC address and a transmission destination MAC address into the Ethernet frame, and refers to the address table, thereby identifying a communication port 54 that corresponds to the transmission destination MAC address. Then, the switch unit 51A transmits, to the function unit 111D via the identified communication port 54, the Ethernet frame received from the validation unit 55A.

When the communication unit 28 in the function unit 111D has received the Ethernet frame including the validation data request from the switch device 101A, the communication unit 28 acquires the validation data request included in the Ethernet frame and outputs the validation data request to the processor 21.

When the core unit 23 in the processor 21 has received the validation data request from the communication unit 28, the core unit 23 acquires the written hash value and checksum of the firmware, which are validation data stored in the FROM 26, for example, and outputs the hash value and the checksum to the communication unit 28.

The communication unit 28 generates an Ethernet frame that includes the validation data received from the core unit 23, and transmits the Ethernet frame to the switch device 101A.

Upon receiving the Ethernet frame transmitted from the function unit 111D, the switch device 101A stores the received Ethernet frame into the storage unit 53A.

The validation unit 55A acquires the hash value and the checksum included in the Ethernet frame stored in the storage unit 53A.

The validation unit 55A collates the acquired hash value and checksum, and the hash value and checksum in the check value table stored in the storage unit 53A with each other.

If the hash values and checksums having been collated do not match each other, the validation unit 55A determines that the corresponding function unit 111 has an abnormality.

Modification 2

In the validation process, the switch device 101 acquires authentication data for stored data from the function unit 111, and validates the function unit 111 by using the acquired authentication data.

More specifically, for example, in the validation process, the switch device 101A transmits a resetting command to the function unit 111D and forcedly causes the function unit 111D to restart.

When the restart has been completed and the state has been shifted to the initial state, the function unit 111D becomes able to communicate with the switch device 101A.

As a result of the switch device 101A becoming able to communicate with the function unit 111D, the switch device 101A detects completion of the restart of the function unit 111D. Then, the switch device 101A transmits a confirmation request to the function unit 111D.

More specifically, the switch device 101A requests authentication by an ID and a password, for example, by using a predetermined protocol.

More specifically, the validation unit 55A generates an Ethernet frame that includes, as the confirmation request, an authentication data request indicating that authentication data is requested, and outputs the Ethernet frame to the switch unit 51A.

The switch unit 51A writes a transmission source MAC address and a transmission destination MAC address into the Ethernet frame, and refers to the address table, thereby identifying a communication port 54 that corresponds to the transmission destination MAC address. Then, the switch unit 51A transmits, to the function unit 111D via the identified communication port 54, the Ethernet frame received from the validation unit 55A.

When the communication unit 28 in the function unit 111D has received the Ethernet frame including the authentication data request from the switch device 101A, the communication unit 28 acquires the authentication data request included in the Ethernet frame and outputs the authentication data request to the processor 21.

When the core unit 23 in the processor 21 has received the authentication data request from the communication unit 28, the core unit 23 acquires the ID and the password, which are authentication data stored in the FROM 26, for example, and outputs the ID and the password to the communication unit 28.

The communication unit 28 generates an Ethernet frame that includes the authentication data received from the core unit 23, and transmits the Ethernet frame to the switch device 101A.

Upon receiving the Ethernet frame transmitted from the function unit 111D, the switch device 101A stores the received Ethernet frame into the storage unit 53A.

The validation unit 55A acquires the ID and the password included in the stored Ethernet frame, and performs authentication regarding the function unit 111D by using the acquired ID and password. When the function unit 111D is not re-authenticated, the validation unit 55A determines that the function unit 111D has an abnormality.

Operation Flow

Each of the devices in the on-vehicle communication system 301 includes a computer. An arithmetic processing unit such as a CPU in the computer reads out a program including a part or all of steps in the sequence diagram or flow chart described below from a memory (not shown), and executes the program. The programs for the plurality of devices can be installed from outside. The programs for the plurality of devices are each distributed in a state of being stored in a storage medium.

Figure 9:
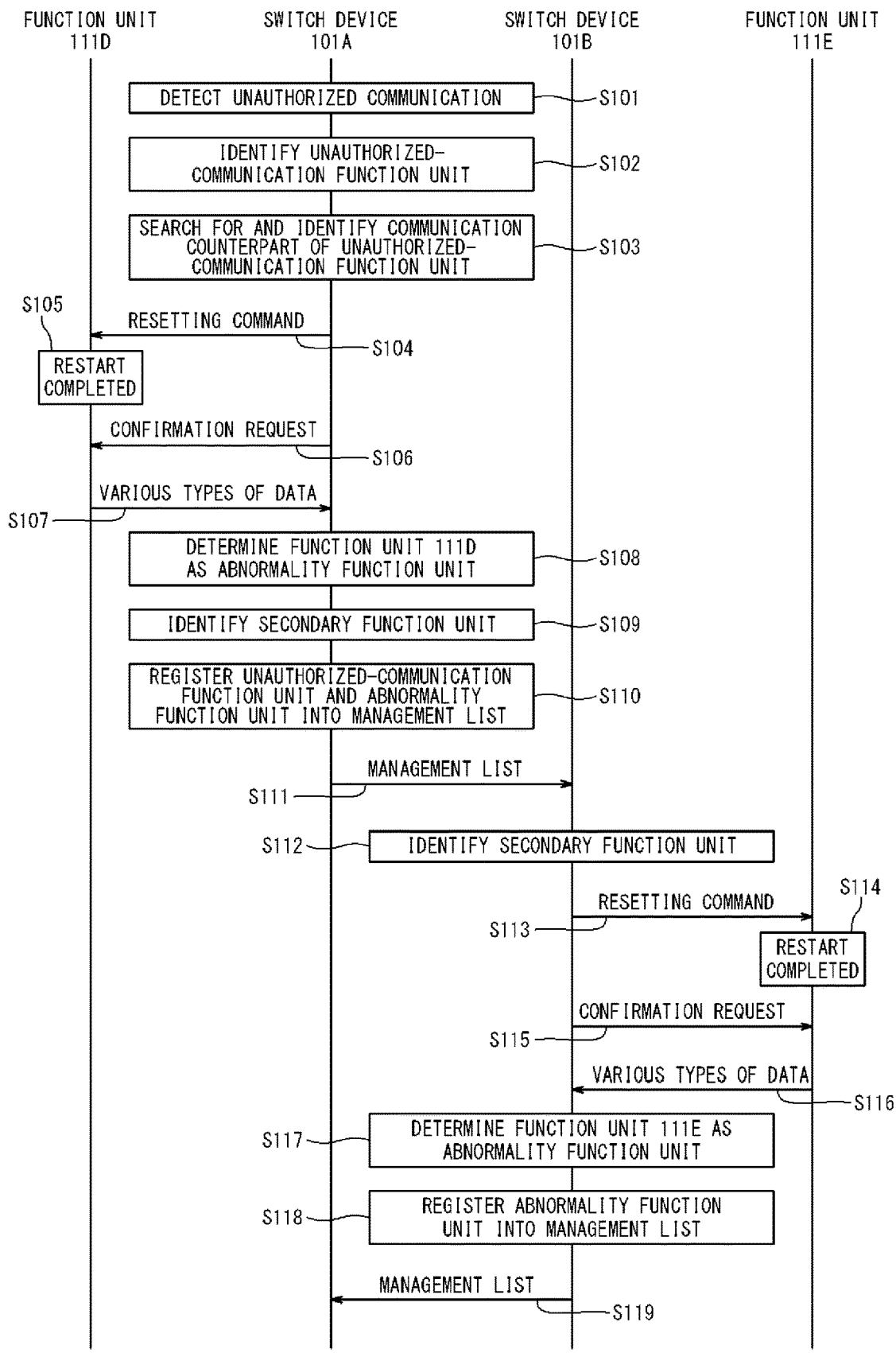
FIG. 9 shows a sequence of a process of validating unauthorized communication in the on-vehicle communication system according to the embodiment of the present disclosure.

FIG. 9 shows a sequence of the process of validating unauthorized communication in the on-vehicle communication system according to the embodiment of the present disclosure. FIG. 9 shows a representative process in which the switch device 101A and the switch device 101B validate unauthorized communication.

With reference to FIG. 9, first, the switch device 101A detects unauthorized communication at a communication port 54 thereof (step S101).

Next, the switch device 101A identifies the function unit 111C as the unauthorized-communication function unit that is the transmission source in the unauthorized communication (step S102).

Next, the switch device 101A refers to the relay information Tab1 to search for a primary function unit, and identifies the function unit 111D as the primary function unit (step S103).

Next, the switch device 101A transmits a resetting command to the function unit 111D (step S104).

Next, the function unit 111D restarts according to the received resetting command. When the restart has been completed and the state has been shifted to the initial state, the function unit 111D becomes able to communicate with the switch device 101A (step S105).

Next, upon detecting completion of the restart of the function unit 111D, the switch device 101A transmits, to the function unit 111D, a confirmation request that requests various types of data, i.e., validation result information, validation data, or authentication data (step S106).

Next, the function unit 111D transmits the validation result information, the validation data, or the authentication data to the switch device 101A (step S107).

Next, as a result of confirming the validation result information, the validation data, or the authentication data, the switch device 101A determines that the function unit 111D is an abnormality function unit (step S108).

Next, the switch device 101A searches for a secondary function unit that is a function unit 111 serving as the communication counterpart of the abnormality function unit, and identifies the function unit 111E as the secondary function unit (step S109).

Next, the switch device 101A refers to the relay information Tab1, confirms that the function unit 111E is connected to the switch device 101B, and registers, into the management list, the function unit 111C which is the unauthorized-communication function unit, and the function unit 111D which is the abnormality function unit (step S110).

Next, the switch device 101A transmits the management list to the switch device 101B (step S111).

Next, the switch device 101B refers to the received management list and the relay information Tab2, and searches for a primary function unit and a secondary function unit, thereby identifying the function unit 111E as the secondary function unit (step S112).

Next, the switch device 101B transmits a resetting command to the function unit 111E (step S113).

Next, the function unit 111E restarts according to the received resetting command. When the restart has been completed and the state has been shifted to the initial state, the function unit 111E becomes able to communicate with the switch device 101B (step S114).

Next, upon detecting completion of the restart of the function unit 111E, the switch device 101B transmits, to the function unit 111E, a confirmation request that requests various types of data, i.e., validation result information, validation data, or authentication data (step S115).

Next, the function unit 111E transmits the validation result information, the validation data, or the authentication data to the switch device 101B (step S116).

Next, as a result of confirming the validation result information, the validation data, or the authentication data, the switch device 101B determines that the function unit 111E is an abnormality function unit (step S117).

Next, the switch device 101B registers the function unit 111E into the management list (step S118).

Next, the switch device 101B transmits the management list to the switch device 101A (step S119).

Figure 10:
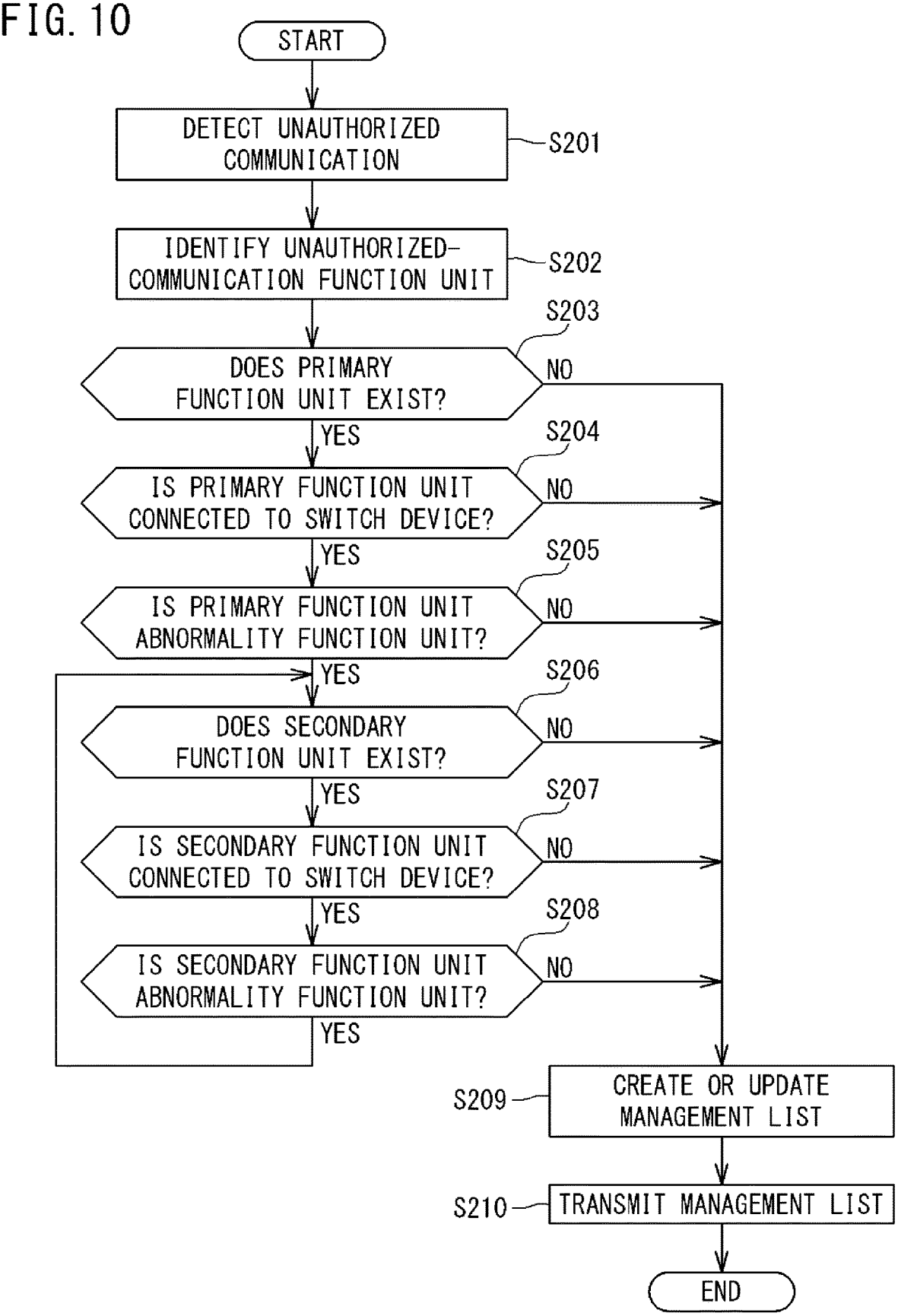
FIG. 10 is a flow chart describing an operation procedure according to which the switch device performs a validation process of validating unauthorized communication according to the embodiment of the present disclosure.

FIG. 10 is a flow chart describing an operation procedure according to which the switch device performs the validation process of validating unauthorized communication according to the embodiment of the present disclosure.

With reference to FIG. 10, first, the switch device 101 detects unauthorized communication at a communication port 54 thereof (step S201).

Next, the switch device 101 identifies an unauthorized-communication function unit that is the transmission source in the unauthorized communication (step S202).

Next, the switch device 101 refers to the relay information Tab1 and searches for a primary function unit (step S203).

Next, when the primary function unit does not exist (NO in step S203), the switch device 101 generates or updates a management list (step S209), and transmits the management list to another switch device 101 (step S210).

Meanwhile, when the primary function unit exists (YES in step S203) and the primary function unit is connected to another switch device 101 (NO in step S204), the switch device 101 transmits the management list to the other switch device 101 (step S210).

Meanwhile, when the primary function unit is connected to the switch device 101 (YES in step S204), the switch device 101 validates the primary function unit (step S205).

Next, when having determined that the primary function unit is normal in the validation process (NO in step S205), the switch device 101 generates or updates a management list (step S209), and transmits the management list to another switch device 101 (step S210).

Meanwhile, when having determined in the validation process that the primary function unit has an abnormality (YES in step S205), the switch device 101 refers to the relay information Tab1 and searches for a secondary function unit that is a function unit 111 serving as the communication counterpart of the abnormality function unit (step S206).

Next, when the secondary function unit does not exist (NO in step S206), the switch device 101 generates or updates a management list (step S209), and transmits the management list to another switch device 101 (step S210).

Meanwhile, when the secondary function unit exists (YES in step S206) and the secondary function unit is connected to another switch device 101 (NO in step S207), the switch device 101 generates or updates a management list (step S209) and transmits the management list to another switch device 101 (step S210).

Meanwhile, when the secondary function unit is connected to the switch device 101 (YES in step S207), the switch device 101 validates the secondary function unit (step S208).

Next, when having determined in the validation process that the secondary function unit is normal (NO in step S208), the switch device 101 generates or updates a management list (step S209), and transmits the management list to another switch device 101 (step S210).

Meanwhile, when having determined in the validation process that the secondary function unit has an abnormality (YES in step S208), the switch device 101 refers to the relay information Tab 1 and searches for a secondary function unit that is a function unit 111 serving as the communication counterpart of the abnormality function unit (step S206).

In the switch device according to the embodiment of the present disclosure, the control unit 52 detects unauthorized communication. However, the present disclosure is not limited thereto. For example, the switch device 101 may be configured to acquire information indicating that unauthorized communication has been detected, from another switch device 101 or a function unit 111 that is connected to the switch device 101. In this case, upon acquiring the information indicating that unauthorized communication has been detected, the control unit 52 outputs the information to the validation unit 55.

In the switch device according to the embodiment of the present disclosure, the validation unit 55 determines, as the validation process, whether or not the function unit 111 has an abnormality. However, the present disclosure is not limited thereto. The validation unit 55 may be configured to determine, as the validation process, the possibility that the function unit 111 has an abnormality.

In the on-vehicle communication system according to the embodiment of the present disclosure, the switch device 101 identifies a primary function unit on the basis of relay information, and validates the primary function unit. However, the present disclosure is not limited thereto. The switch device 101 may be configured to validate, without using the relay information, all the function units 111 that are connected to the switch device 101, for example.

In the on-vehicle communication system according to the embodiment of the present disclosure, the switch device 101 further validates a secondary function unit. However, the present disclosure is not limited thereto. The switch device 101 may be configured to perform the validation of only the primary function unit.

In the on-vehicle communication system according to the embodiment of the present disclosure, the switch device 101 holds a management list. However, the present disclosure is not limited thereto. The switch device 101 may be configured to perform the validation process without holding a management list.

In the on-vehicle communication system according to the embodiment of the present disclosure, the switch device 101 transmits a management list to another switch device 101 connected to the switch device 101, and causes the other switch device 101 to validate the function unit 111 connected to the other switch device 101. However, the present disclosure is not limited thereto. The switch device 101 may be configured not to transmit the management list to the other switch device 101.

In the on-vehicle communication system according to the embodiment of the present disclosure, the switch device 101 transmits the management list to another switch device every time the switch device 101 updates the management list. However, the present disclosure is not limited thereto. The switch device 101 may be configured to transmit the management list to another switch device at a predetermined timing.

Meanwhile, there is a demand for a technology that can appropriately cope with a case where an unauthorized state has occurred in an on-vehicle network.

For this, in the on-vehicle communication system according to the embodiment of the present disclosure, the switch device 101 performs a relay process of relaying communication data between a plurality of function units 111. When unauthorized communication by a function unit 111 has been detected, the switch device 101 performs a validation process of validating a function unit 111 other than an unauthorized-communication function unit that is the function unit 111 for which the unauthorized communication has been detected.

With this configuration, when unauthorized communication has been performed due to, for example, unauthorized rewriting into firmware in a function unit 111, a function unit 111 serving as the communication counterpart of the function unit 111 that has a possibility of being in an unauthorized or abnormal state is validated. Thus, increase of damage can be inhibited.

Therefore, in the on-vehicle communication system according to the embodiment of the present disclosure, the function of coping with an unauthorized activity in an on-vehicle network can be improved.

In the on-vehicle communication system according to the embodiment of the present disclosure, the switch device 101: performs the relay process by using relay information indicating the relationship of communication between the function units 111; as the validation process, identifies a function unit 111 serving as a communication counterpart of the unauthorized-communication function unit that is the function unit 111 for which unauthorized communication has been detected, on the basis of the relay information; and validates the identified function unit 111.

With this configuration, a function unit 111 that communicates with the function unit 111 that has performed unauthorized communication can be accurately and easily identified and validated.

In the on-vehicle communication system according to the embodiment of the present disclosure, as the validation process, the switch device 101 further validates a secondary function unit that is a function unit 111 serving as a communication counterpart of an abnormality function unit that is a function unit 111 determined as having an abnormality in the validation process.

With the configuration in which the validation is performed stepwise in this manner, a function unit 111 that has a possibility of being in an unauthorized or abnormal state can be identified, and appropriate measures can be taken before damage is increased.

In the on-vehicle communication system according to the embodiment of the present disclosure, the switch device 101 holds a management list indicating at least one of: the unauthorized-communication function unit that is the function unit 111 for which the unauthorized communication has been detected; and an abnormality function unit that is a function unit 111 determined as having an abnormality in the validation process.

With this configuration, various types of measures can be easily taken by using the management list indicating the identified function unit 111.

In the on-vehicle communication system according to the embodiment of the present disclosure, the switch device 101 performs a process of, when a secondary function unit that is a function unit 111 serving as a communication counterpart of the abnormality function unit that is a function unit 111 determined as having an abnormality in the validation process is connected to another switch device 101, providing the management list to the other switch device 101 and causing the other switch device 101 to validate the secondary function unit.

With this configuration, with respect to a function unit 111 that is not directly connected to the switch device 101, the validation process can be performed via another switch device 101.

In the on-vehicle communication system according to the embodiment of the present disclosure, every time the switch device 101 updates the management list, the switch device 101 transmits the updated management list to another switch device 101.

With this configuration, information of the identified function unit 111 can be always shared between the switch devices 101, and a validation process in a wider range can be performed.

In the on-vehicle communication system according to the embodiment of the present disclosure, in the validation process, the switch device 101 acquires validation data for stored data from the function unit 111, and validates the function unit 111 by using the acquired validation data.

With this configuration, in the switch device 101, an abnormality such as falsification of firmware of the function unit 111 can be detected.

In the on-vehicle communication system according to the embodiment of the present disclosure, in the validation process, the switch device 101 acquires authentication data for stored data from the function unit 111, and validates the function unit 111 by using the acquired authentication data.

With this configuration, an abnormality such as falsification of firmware can be detected by a simpler process.

In a switch device according to the embodiment of the present disclosure, the switch unit 51 performs a relay process of relaying communication data between a plurality of function units. When unauthorized communication by a function unit 111 has been detected, the validation unit 55 performs a validation process of validating a function unit 111 other than an unauthorized-communication function unit that is the function unit 111 for which the unauthorized communication has been detected.

With this configuration, when unauthorized communication has been performed due to, for example, unauthorized rewriting into firmware in a function unit 111, a function unit 111 serving as the communication counterpart of the function unit 111 that has a possibility of being in an unauthorized or abnormal state is validated. Thus, increase of damage can be inhibited.

Therefore, in the switch device according to the embodiment of the present disclosure, the function of coping with an unauthorized activity in an on-vehicle network can be improved.

In a validation method to be performed in the on-vehicle communication system according to the embodiment of the present disclosure, first, the switch device 101 acquires a detection result of unauthorized communication performed by a function unit 111. Next, the switch device 101 transmits a confirmation request to a function unit 111 serving as a communication counterpart of an unauthorized-communication function unit that is the function unit 111 for which the unauthorized communication has been detected. Next, the function unit 111 serving as the communication counterpart of the unauthorized-communication function unit transmits, to the switch device 101, response information to the confirmation request.

With this configuration, when unauthorized communication has been performed due to, for example, unauthorized rewriting into firmware in a function unit 111, a function unit 111 serving as the communication counterpart of the function unit 111 that has a possibility of being in an unauthorized or abnormal state is validated. Thus, increase of damage can be inhibited.

Therefore, in the validation method to be performed in the on-vehicle communication system according to the embodiment of the present disclosure, the function of coping with an unauthorized activity in an on-vehicle network can be improved.

In a validation method to be performed in the switch device according to the embodiment of the present disclosure, first, a detection result of unauthorized communication performed by a function unit 111 is acquired. Next, when unauthorized communication performed by the function unit 111 has been detected, a validation process of validating a function unit 111 other than an unauthorized-communication function unit that is the function unit 111 for which the unauthorized communication has been detected, is performed.

With this configuration, when unauthorized communication has been performed due to, for example, unauthorized rewriting into firmware in a function unit 111, a function unit 111 serving as the communication counterpart of the function unit 111 that has a possibility of being in an unauthorized or abnormal state is validated. Thus, increase of damage can be inhibited.

Therefore, in the validation method to be performed in the switch device according to the embodiment of the present disclosure, the function of coping with an unauthorized activity in an on-vehicle network can be improved.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

Additional Note 1

An on-vehicle communication system comprising:
a plurality of function units; and
one or a plurality of switch devices, each switch device being configured to perform a relay process of relaying communication data between the function units, wherein
when unauthorized communication by a function unit has been detected, the switch device performs a validation process of validating a function unit other than an unauthorized-communication function unit that is the function unit for which the unauthorized communication has been detected, and
as the validation process, the switch device transmits a confirmation request to the function unit other than the unauthorized-communication function unit, and receives, from the function unit other than the unauthorized-communication function unit, information indicating a determination result as to whether or not data thereof is proper.

Additional Note 2

A switch device to be used in an on-vehicle communication system, the switch device comprising:
a switch unit configured to perform a relay process of relaying communication data between a plurality of function units; and
a validation unit configured to perform, when unauthorized communication by a function unit has been detected, a validation process of validating a function unit other than an unauthorized-communication function unit that is the function unit for which the unauthorized communication has been detected, wherein
as the validation process, the validation unit transmits via the switch unit a confirmation request to the function unit other than the unauthorized-communication function unit, and
the switch unit receives, from the function unit other than the unauthorized-communication function unit, information indicating a determination result as to whether or not data thereof is proper.

REFERENCE SIGNS LIST 1 vehicle
10 Ethernet cable
21 processor
22 built-in HW
23 core unit
24 secure ROM
26 FROM
27 DRAM
28 communication unit
51 switch unit
52 control unit
53 storage unit
54 communication port
55 validation unit
101 switch device
111 function unit
301 on-vehicle communication system

The invention claimed is:

1. An on-vehicle communication system comprising:
a plurality of function units; and
one or a plurality of switch devices, each switch device being configured to perform a relay process of relaying communication data between the function units, wherein
when unauthorized communication by a function unit has been detected, the switch device performs a validation process of validating a function unit other than an unauthorized-communication function unit that is the function unit for which the unauthorized communication has been detected, and
the validation process is a process for determining whether or not the function unit other than the unauthorized-communication function unit has an abnormality.

2. The on-vehicle communication system according to claim 1, wherein
the switch device: performs the relay process by using relay information indicating a relationship of communication between the function units; as the validation process, identifies a function unit serving as a communication counterpart of the unauthorized-communication function unit, on the basis of the relay information; and
validates the identified function unit.

3. The on-vehicle communication system according to claim 1, wherein
as the validation process, the switch device further validates a secondary function unit that is a function unit serving as a communication counterpart of an abnormality function unit that is a function unit determined as having an abnormality in the validation process.

4. The on-vehicle communication system according to claim 1, wherein
the on-vehicle communication system includes a plurality of the switch devices, and
each switch device holds a list indicating at least one of the unauthorized-communication function unit, and an abnormality function unit that is a function unit determined as having an abnormality in the validation process.

5. The on-vehicle communication system according to claim 4, wherein
the switch device performs a process of, when a secondary function unit that is a function unit serving as a communication counterpart of the abnormality function unit is connected to another switch device, providing the list to the other switch device and causing the other switch device to validate the secondary function unit.

6. The on-vehicle communication system according to claim 4, wherein
every time the switch device updates the list, the switch device transmits the updated list to another switch device.

7. The on-vehicle communication system according to claim 1, wherein
in the validation process, the switch device acquires validation data for stored data from the function unit, and validates the function unit by using the acquired validation data.

8. The on-vehicle communication system according to claim 1, wherein
in the validation process, the switch device acquires authentication data for stored data from the function unit, and validates the function unit by using the acquired authentication data.

9. A switch device to be used in an on-vehicle communication system, the switch device comprising:
a switch unit configured to perform a relay process of relaying communication data between a plurality of function units; and
a validation unit configured to perform, when unauthorized communication by a function unit has been detected, a validation process of validating a function unit other than an unauthorized-communication function unit that is the function unit for which the unauthorized communication has been detected, wherein
the validation process is a process for determining whether or not the function unit other than the unauthorized-communication function unit has an abnormality.

10. A validation method to be performed in an on-vehicle communication system, the on-vehicle communication system including a plurality of function units and one or a plurality of switch devices, each switch device being configured to perform a relay process of relaying communication data between the function units,
the validation method comprising the steps of:
acquiring, performed by the switch device, a detection result of unauthorized communication performed by a function unit;
transmitting, performed by the switch device, a confirmation request to a function unit serving as a communication counterpart of an unauthorized-communication function unit that is the function unit for which the unauthorized communication has been detected; and
transmitting to the switch device, performed by the function unit serving as the communication counterpart of the unauthorized-communication function unit, response information to the confirmation request, wherein
the response information indicates whether or not the function unit serving as the communication counterpart of the unauthorized-communication function unit has an abnormality.

11. A validation method to be performed in a switch device configured to perform a relay process of relaying communication data between a plurality of function units, the validation method comprising the steps of:
acquiring a detection result of unauthorized communication performed by a function unit; and
performing, when the unauthorized communication performed by the function unit has been detected, a validation process of validating a function unit other than an unauthorized-communication function unit that is the function unit for which the unauthorized communication has been detected, wherein
the validation process is a process for determining whether or not the function unit other than the unauthorized-communication function unit has an abnormality.

12. A non-transitory computer readable storage medium storing a computer program to be used in a switch device, the computer program being configured to cause a computer to function as:
a switch unit configured to perform a relay process of relaying communication data between a plurality of function units; and
a validation unit configured to perform, when unauthorized communication by a function unit has been detected, a validation process of validating a function unit other an unauthorized-communication function unit that is the function unit for which the
unauthorized communication has been detected, wherein
the validation process is a process for determining whether or not the function unit other than the unauthorized-communication function unit has an abnormality.

* * * * *